(12) United States Patent
Laudan et al.

(10) Patent No.: US 10,718,367 B2
(45) Date of Patent: Jul. 21, 2020

(54) COMPONENT CONNECTION

(71) Applicant: Bayerische Motoren Werke Aktiengesellschaft, Munich (DE)

(72) Inventors: Alexander Laudan, Munich (DE);
Mario Ernst, Geisenhausen (DE);
Johann Van Niekerk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 790 days.

(21) Appl. No.: 14/876,982

(22) Filed: Oct. 7, 2015

(65) Prior Publication Data

US 2016/0025126 A1 Jan. 28, 2016

Related U.S. Application Data

(63) Continuation of application No. PCT/EP2014/060428, filed on May 21, 2014.

(30) Foreign Application Priority Data

Jun. 25, 2013 (DE) .......................... 10 2013 211 993

(51) Int. Cl.
*F16B 21/12* (2006.01)
*F16B 5/06* (2006.01)

(52) U.S. Cl.
CPC ............ *F16B 21/12* (2013.01); *F16B 5/0628* (2013.01)

(58) Field of Classification Search
CPC ............................ F16B 5/0642; F16B 5/0664
See application file for complete search history.

(56) References Cited

U.S. PATENT DOCUMENTS 203,308 A * 5/1878 Wood ....................... A44B 1/34
24/108
2,275,900 A * 3/1942 Hall ..................... B23K 11/002
24/662
(Continued)

FOREIGN PATENT DOCUMENTS

CN 102261363 A 11/2011
DE 28 34 432 A1 10/1979
(Continued)

OTHER PUBLICATIONS

International Search Report (PCT/ISA/210) issued in PCT Application No. PCT/EP2014/060428 dated Aug. 22, 2014 with English translation (eight pages).

(Continued)

*Primary Examiner* — Daniel J Wiley
(74) *Attorney, Agent, or Firm* — Crowell & Moring LLP

(57) ABSTRACT

A form-fitting, detachable component connection includes a first component and a male securing element that has at least two spheres which are arranged coaxially to one another and interconnected, or two spherical sections which are arranged coaxially to one another and interconnected. The male element protrudes from the first component. A second component is arranged such that the male securing element projects into a recess of the second component. The second component includes at least one blocking recess through which or into which a blocking element extends which bears against the male securing element from outside and form-fittingly engages between the spheres or the spherical sections thus opposing removal of the second component from the male securing element.

18 Claims, 1 Drawing Sheet

(56) References Cited

U.S. PATENT DOCUMENTS

| | | | | |
|---|---|---|---|---|
| 2,526,790 | A * | 10/1950 | Wroblewski | F16B 21/078 24/110 |
| 2,943,373 | A * | 7/1960 | Rapata | F16B 21/075 24/662 |
| 3,843,078 | A * | 10/1974 | Schon | B64D 37/04 244/135 B |
| 4,505,058 | A * | 3/1985 | Peterson | E02F 9/2841 24/581.1 |
| 4,865,504 | A * | 9/1989 | Kaimo | E04B 1/215 411/361 |
| 4,929,117 | A | 5/1990 | Yamanoi | |
| 5,048,996 | A * | 9/1991 | Dubois | F16B 21/186 16/DIG. 40 |
| 5,518,332 | A * | 5/1996 | Katoh | F16B 21/16 285/305 |
| 5,704,100 | A * | 1/1998 | Swan | F16B 21/186 24/546 |
| 7,922,413 | B2 * | 4/2011 | Roth | B64C 1/066 403/122 |
| 9,631,655 | B2 * | 4/2017 | Van Niekerk | F16B 21/07 |
| 9,687,928 | B2 * | 6/2017 | Van Niekerk | F16B 5/08 |
| 9,751,282 | B2 * | 9/2017 | Van Niekerk | B32B 7/08 |
| 9,873,186 | B2 * | 1/2018 | Herzinger | B23K 31/02 |
| 10,022,938 | B2 * | 7/2018 | Van Niekerk | B32B 7/08 |
| 2007/0166098 | A1 | 7/2007 | Roth et al. | |
| 2014/0147195 | A1 * | 5/2014 | Herzinger | B23K 31/02 403/345 |
| 2014/0294488 | A1 * | 10/2014 | Van Niekerk | F16B 5/08 403/266 |
| 2015/0033532 | A1 | 2/2015 | Van Niekerk et al. | |
| 2016/0114739 | A1 * | 4/2016 | Korber | F16B 21/075 24/292 |
| 2016/0123363 | A1 * | 5/2016 | Hammer | F16B 5/0642 24/708.6 |
| 2016/0138626 | A1 * | 5/2016 | Van Niekerk | F16B 5/0628 24/594.1 |
| 2016/0227886 | A1 * | 8/2016 | Van Niekerk | B23K 31/02 |
| 2016/0257092 | A1 * | 9/2016 | Van Niekerk | B32B 7/08 |
| 2016/0262500 | A1 * | 9/2016 | Van Niekerk | F16B 21/165 |
| 2016/0265567 | A1 * | 9/2016 | Van Niekerk | F16B 21/07 |
| 2017/0097026 | A1 * | 4/2017 | Korber | F16B 5/0642 |
| 2017/0114816 | A1 * | 4/2017 | Schulz | F16B 2/04 |
| 2017/0138381 | A1 * | 5/2017 | Hammer | F16B 5/0096 |
| 2017/0305112 | A1 * | 10/2017 | Van Niekerk | B32B 7/08 |
| 2018/0015677 | A1 * | 1/2018 | Stefanziosa | B29C 65/08 |

FOREIGN PATENT DOCUMENTS

| | | | |
|---|---|---|---|
| DE | 10354114 A1 * | 8/2004 | F16B 12/24 |
| DE | 10 2010 015 179 A1 | 12/2010 | |
| DE | 10 2012 206 938 B3 | 2/2013 | |
| GB | 2 018 876 A | 10/1979 | |
| WO | WO 2005/100802 A1 | 10/2005 | |

OTHER PUBLICATIONS

Chinese Office Action issued in counterpart Chinese Application No. 201480023829.1 dated May 30, 2016, with English translation (nineteen (19) pages).

Chinese Office Action issued in counterpart Chinese Application No. 201480023829.1 dated Jan. 17, 2017 with English-language translation (eight (8) pages).

* cited by examiner

COMPONENT CONNECTION

CROSS REFERENCE TO RELATED APPLICATIONS

This application is a continuation of PCT International Application No. PCT/EP2014/060428, filed May 21, 2014, which claims priority under 35 U.S.C. § 119 from German Patent Application No. 10 2013 211 993.3, filed Jun. 25, 2013, the entire disclosures of which are herein expressly incorporated by reference.

BACKGROUND AND SUMMARY OF THE INVENTION

The present invention relates to a component connection having a first component, a male securing element which has at least two interconnected spheres which are disposed so as to be coaxial in relation to one another, or two interconnected spherical portions which are disposed so as to be coaxial in relation to one another, and which projects from the first component, and a second component, which is disposed such that the male securing element protrudes into a clearance of the second component.

A component connection of this type is disclosed in DE 10 2012 206 938 B3. There, a male securing element which is formed by two interconnected spheres and which protrudes through a through hole which is provided in a second component is welded onto a first component. A clip element which engages across the through hole and thus clamps together the two components is clipped onto the male securing element. In a component connection of this type the clip element has to be clipped onto the male securing element, which is formed by two or more spheres, using a minimum degree of force. In order for the clip element to be detached from the male securing element, a very high force may be required, depending on the exact construction of the clip element.

It is an object of the invention to provide a form-fitting, releasable component connection which is capable of being established using low assembly forces and capable of being disassembled using low disassembling forces and which in the assembled state has great strength.

This and other objects are achieved in accordance with embodiments of the invention.

The starting point for the invention is a form-fitting, releasable component connection having a first component from which a male securing element projects. The male securing element has at least two interconnected spheres which are disposed so as to be coaxial in relation to one another, or two interconnected spherical or spherically shaped portions which are disposed so as to be coaxial in relation to one another.

The first component and the male securing element may be manufactured from one and the same material or from different materials. For example, the first component may be a sheet-metal part, a plastics part, a wooden part or similar. The male securing element may be composed of steel, aluminum, plastics, wood or similar, for example.

Furthermore, the releasable component connection has a second component which is disposed such that the male securing element protrudes into a clearance recess of the second component.

The core of the invention lies in that the second component has at least one "blocking clearance" through which or into which a "blocking element" extends. In the assembled state, the blocking element bears from the outside on the male securing element and, specifically, in such a manner that it engages in a form-fitting manner between the spheres or the spherical or spherically shaped portions and, on account thereof, resists detachment of the second component from the male securing element. The blocking element thus has a function which is similar to that of a "cotter pin".

In order for a component connection of this type to be established, the second component may be placed onto the male securing element almost without force. Subsequently, the at least one blocking element is applied, that is to say introduced into the blocking clearance, likewise almost without force or with only a light joining force. In the assembled state a component connection of this type, on account of the form fit, withstands even very high detachment forces.

The male securing element having at least two spheres or at least two spherical or spherically shaped portions is preferably configured such that the at least two spheres or spherical or spherically shaped portions are directly interconnected. For example, they may be integrally interconnected or be welded, screwed, adhesively bonded or be interconnected in another way.

The male securing element may be connected to the first component in a materially integral manner. For example, the former may be connected to the first component by welding. Alternatively or complementarily thereto, the male securing element may be connected to the first component in a form-fitting manner, for example by screwing, riveting, clinching, etc. Alternatively thereto, the male securing element may be integrally connected to the first component. In the case of a plastics component, the male securing element may be, by way of example, injection-molded in one operational step together with the first component. Alternatively thereto, the male securing element may at least partially be injection-molded or laminated within the first component.

According to one refinement of the invention, the second component has a housing-type frame, wherein a passage or a through-hole, respectively, through which the blocking element is pushed through or into which the blocking element is inserted, respectively, is provided in a first wall of the frame.

It may be provided in particular that in each case one through hole through which or into which the blocking element extends is provided in two mutually opposite walls of the frame. The blocking element may have a blocking arm. Alternatively thereto, the blocking element could also have two or a plurality of blocking arms. In the case of a blocking element having two arms it may be provided that the two blocking arms from the outside bear on the securing element on two mutually opposite sides of the securing element and engage in a form-fitting manner between the spheres or spherical or spherically formed portions of the securing element.

The blocking element, or the arm or the arms of the blocking element, respectively, may be designed to be flexural. In particular, the blocking element may be configured to be a "bracket-type element". It may be manufactured from a round wire or from plastics, for example, or from another material. Alternatively thereto, the blocking element could also be manufactured from sheet metal in the form of a cut-and-bend part.

It may furthermore be provided that the blocking element has a portion which protrudes from the frame and at least partially brackets the frame. On account thereof, it is ensured that the blocking element is captively, or captively secured in a relative sense, respectively, in a force-fitting and/or form-fitting manner on the second component.

A component connection of this type may be employed in the most varied of technical fields, for example in the automotive industry, in the furniture industry, in the field of "white goods", etc. Accordingly, the first component may be a vehicle component, for example, a vehicle body component, for example, on which a wiring loom, for example, or another component may be secured by way of the second component.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
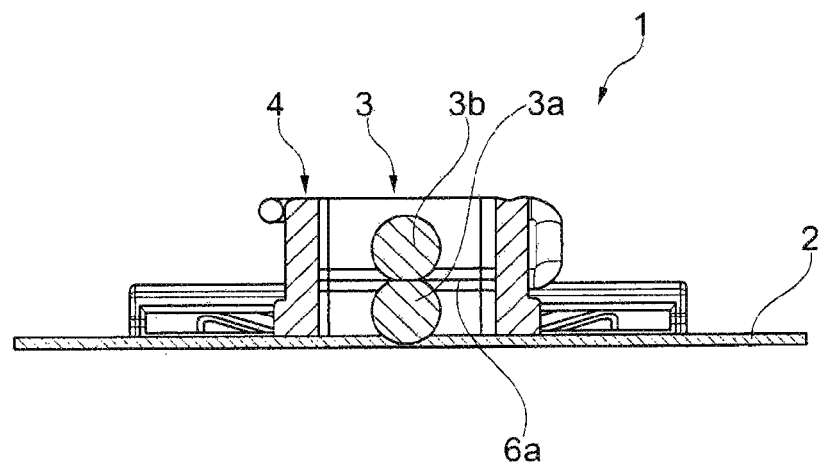
FIG. 1 is a longitudinal sectional view of a component connection taken along I-I in FIG. 2 according to an embodiment of the invention.
Figure 2:
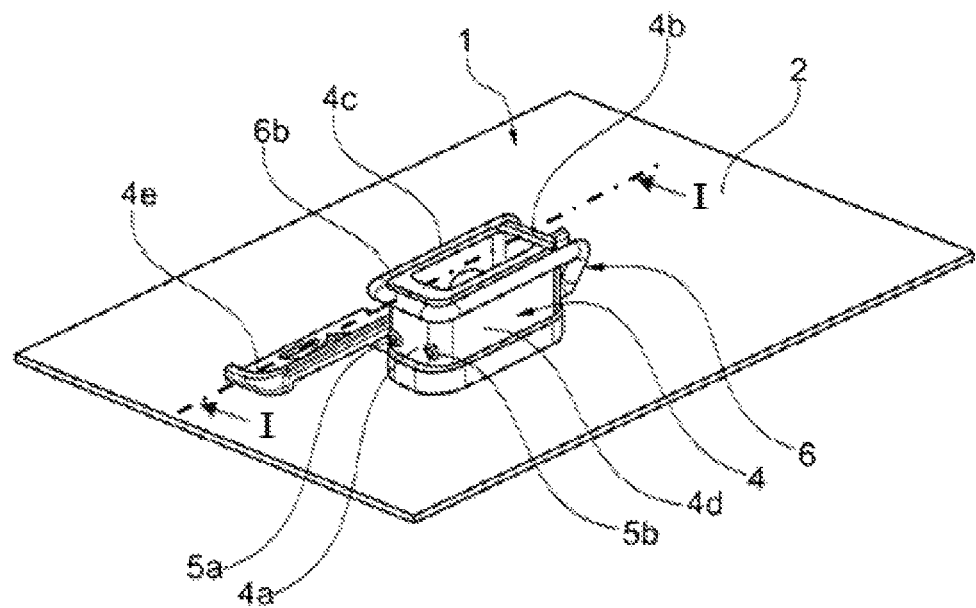
FIG. 2 is a perspective view of the component connection shown in FIG. 1.

FIGS. 1 and 2 show a form-fitting, releasable component connection 1 having a first component 2 from which a male securing element 3 projects. The male securing element 3 is here formed by two fixedly interconnected spheres 3a, 3b. For example, the male securing element 3 may be welded to the first component 2 by way of the (lower) sphere 3a.

A second, frame-type component 4 is placed onto the first component 2. The frame-type component 4 in a plan view is similar to a rectangle. It is thus designed to be elongate. It has two mutually opposite broadsides 4a, 4b, and two mutually opposite longitudinal sides 4c, 4d, which are longer than the broadsides 4a, 4b.

On account of the elongate shape of the frame-type component 4, the latter may be displaced in the longitudinal direction in relation to the male securing element and thus offers the function of a "displacement bearing".

Alternatively thereto, the frame-type component could be configured so as to be square or circular, for example. In this way, a "thrust bearing" could be implemented.

In each case, two through holes 5a, 5b are provided in the two broadsides 4a, 4b, only the through holes 5a, 5b which are provided in the front broadside being identifiable in the perspective illustration shown in FIG. 2.

The male securing element 3 protrudes into the second component 4. Two blocking arms of a bracket-like blocking element 6, which in the exemplary embodiment shown here has been bent from a round wire, protrude through the through holes which are provided in the broadsides 4a, 4b.

Only one blocking arm 6a of the two blocking arms can be seen in FIG. 1. The two blocking arms bear from outside on the male securing element 3, specifically in such a manner that they engage in a form-fitting manner between the two spheres 3a, 3b. On account of this form fit it is achieved that the blocking arms resist detachment of the second component 4 from the first component 2, or from the male securing element 3 which is connected thereto, respectively.

As can be seen from FIGS. 1 and 2, the blocking element 6 has a portion 6b which protrudes from the frame, or from the second component 4, respectively, and encloses the second component 4 in a bracket-like fashion. The portion 6b brackets the second component 4 and functions as a captive device. The blocking element 6, by way of the second portion 6b, is thus fixedly bracketed to the second component.

For the sake of completeness, a mounting element 4e, on which a further component may be secured and which projects from the second component 4, is to be mentioned.

An almost endless multiplicity of potential applications exist for the component connection shown in FIGS. 1 and 2. To the extent that the first component is a body panel in a vehicle body, for example, a wiring loom or another module could be releasably fastened thereto by way of the second component 4, or by way of the mounting element 4e which is connected thereto, respectively.

As can be seen from FIGS. 1 and 2, the component connection may be established using extremely low assembly forces, or be released using extremely low disassembly forces, respectively. With the blocking element 6 applied, very high retaining forces or detachment forces, respectively may be achieved with a component connection of this type.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A form-fitting releasable component connection, comprising:
    a first component;
    a male securing element comprising at least two interconnected spheres or spherical portions disposed coaxially relative to one another, the male securing element being located on and projecting away from a wall of the first component;
    a second component configured to be located on the wall of the first component and around the male securing element such that the male securing element on the first component protrudes into a clearance of the second component that is immediately adjacent to the wall of the first component; and
    a blocking element configured to extend into or through the clearance,
    wherein
    the blocking element is removable from the second component,
    the blocking element, when in an installed position on the second component, extends through a wall of the second component that is not parallel to the wall of the first component and engages the male securing element in a form-fitting manner between the at least two interconnected spheres or spherical portions such that the blocking element resists detachment of the second component from the first component, and
    the second component is removable from the first component without passage of the blocking element over the male securing element in a direction away from the wall of the first component after removal of the blocking element from the second component.

2. The component connection according to claim 1, wherein the at least two spheres or spherical portions are directly interconnected.

3. The component connection according to claim 1, wherein the housing frame has a second wall mutually opposite the first wall, the second wall also having a passage through which or into which the blocking element extends.

4. The component connection according to claim 3, wherein
the blocking element comprises two blocking arms, each blocking arm bearing from the outside on the male securing element on a mutually opposite side thereof.

5. The component connection according to claim 4, wherein the blocking element is formed as a bracket element.

6. The component connection according to claim 3, wherein the passages in the mutually opposite walls are formed in broad sides of the housing frame, the broad sides being shorter than longitudinal sides of the housing frame.

7. The component connection according to claim 1, wherein
the blocking element comprises two blocking arms, each blocking arm bearing from the outside on the male securing element on a mutually opposite side thereof.

8. The component connection according to claim 1, wherein the blocking element is flexural.

9. The component connection according to claim 1, wherein
the blocking element includes a portion that protrudes from the second component and is at least partially bent around an exterior surface of the second component,
whereby the blocking element is captively secured in a force-fitting and/or form-fitting manner on the second component.

10. The component connection according to claim 1, wherein the housing frame is configured to be one of an elongated frame, a rectangular frame, a square frame or a circular frame.

11. The component connection according to claim 1, further comprising:
a mounting element configured for mounting a further component, the mounting element projecting from an external side of the second component.

12. The component connection according to claim 1, wherein the male securing element is connected to the first component in a materially integral or form-fitting manner.

13. The component connection according to claim 1, wherein the male securing element is integrally connected to the first component.

14. The component connection according to claim 1, wherein the male securing element is at least partially injection-molded within the first component.

15. The component connection according to claim 1, wherein the blocking element is formed of a round wire or of sheet metal as a cut-and-bend part.

16. The component connection according to claim 1, wherein the first component is a vehicle body component.

17. The component connection according to claim 1, wherein the first wall of the housing frame is perpendicular to the wall of the first component.

18. A form-fitting releasable component connection, comprising:
a first component;
a male securing element comprising at least two interconnected spheres or spherical portions disposed coaxially relative to one another, the male securing element being located on and projecting away from a wall of the first component;
a second component configured to be located on the wall of the first component and around the male securing element such that the male securing element on the first component protrudes into a clearance of the second component that is immediately adjacent to the wall of the first component; and
a blocking element configured to extend into or through the clearance,
wherein
the blocking element is removable from the second component,
the blocking element, when in an installed position on the second component, extends through a wall of the second component that is not parallel to the wall of the first component and engages the male securing element in a form-fitting manner between the at least two interconnected spheres or spherical portions such that the blocking element resists detachment of the second component from the first component,
the blocking element includes a portion that protrudes from the second component and is at least partially bent around an exterior surface of the second component,
the blocking element is captively secured in a force-fitting and/or form-fitting manner on the second component, and
the second component is removable from the first component without passage of the blocking element over the male securing element in a direction away from the wall of the first component after removal of the blocking element from the second component.

* * * * *